US008825620B1

(12) United States Patent
Fliedner et al.

(10) Patent No.: US 8,825,620 B1
(45) Date of Patent: Sep. 2, 2014

(54) BEHAVIORAL WORD SEGMENTATION FOR USE IN PROCESSING SEARCH QUERIES

(75) Inventors: Gerard Fliedner, Munich (DE); Daniel E. Rose, Cupertino, CA (US); David Kirk Evans, Tokyo (JP)

(73) Assignee: A9.com, Inc., Palo Alto, CA (US)

( * ) Notice: Subject to any disclaimer, the term of this patent is extended or adjusted under 35 U.S.C. 154(b) by 194 days.

(21) Appl. No.: 13/159,292

(22) Filed: Jun. 13, 2011

(51) Int. Cl.
*G06F 17/30* (2006.01)

(52) U.S. Cl.
USPC .......................................................... 707/706

(58) Field of Classification Search
CPC ................................................ G06F 17/30401
USPC .......................................................... 707/706
See application file for complete search history.

(56) References Cited

U.S. PATENT DOCUMENTS

| | | | |
|---|---|---|---|
| 5,412,567 A | 5/1995 | Karttunen | |
| 5,684,999 A | 11/1997 | Okamoto | |
| 5,704,060 A | 12/1997 | Del Monte | |
| 5,754,938 A | 5/1998 | Herz et al. | |
| 5,946,648 A | 8/1999 | Halstead, Jr. et al. | |
| 6,307,548 B1 | 10/2001 | Flinchem et al. | |
| 6,470,307 B1 | 10/2002 | Turney | |
| 6,721,734 B1 | 4/2004 | Subasic et al. | |
| 6,741,959 B1 | 5/2004 | Kaiser | |
| 6,820,237 B1 | 11/2004 | Abu-Hakima et al. | |
| 7,072,827 B1 | 7/2006 | Carmel et al. | |
| 7,470,307 B2 | 12/2008 | Larink, Jr. | |
| 7,647,228 B2 | 1/2010 | Silvera et al. | |
| 7,747,428 B1 | 6/2010 | Karsh et al. | |
| 7,890,521 B1 | 2/2011 | Grushetskyy et al. | |
| 7,912,703 B2 | 3/2011 | Magdalen et al. | |
| 8,037,086 B1 * | 10/2011 | Upstill et al. | 707/767 |
| 8,290,961 B2 | 10/2012 | Chew et al. | |
| 8,346,795 B2 | 1/2013 | Roulland et al. | |
| 8,473,279 B2 | 6/2013 | Al-Shammari | |
| 8,515,731 B1 | 8/2013 | Ramirez Robredo et al. | |
| 2003/0055625 A1 | 3/2003 | Korelsky et al. | |
| 2005/0071152 A1 | 3/2005 | Morimoto et al. | |
| 2006/0200336 A1 | 9/2006 | Cipollone et al. | |
| 2009/0055380 A1 | 2/2009 | Peng et al. | |
| 2009/0070323 A1 * | 3/2009 | Parikh et al. | 707/5 |
| 2010/0131900 A1 | 5/2010 | Spetalnick | |
| 2012/0233140 A1 * | 9/2012 | Collins-Thompson et al. | 707/706 |

OTHER PUBLICATIONS

Abdullah et al., "A Stemming Algorithm for Malay Language," CITA 2005, 5 pages.
"Non-Final Office Action dated Nov. 20, 2013", U.S. Appl. No. 12/914,934, 16 pages.
"Notice of Allowance dated Apr. 4, 2014," U.S. Appl. No. 12/914,934, 14 pages.

* cited by examiner

*Primary Examiner* — Hung Q Pham
(74) *Attorney, Agent, or Firm* — Novak Druce Connolly Bove + Quigg LLP

(57) ABSTRACT

Substrings within strings, such as words within words, are identified based at least in part on recorded behavior of users that have submitted the strings or substrings as search queries. The behavior may relate to actions taken by the users upon having submitting the search queries. The actions may be actions taken in connection with an electronic marketplace, such as actions related to the consumption of items offered in the electronic marketplace. The identified strings and corresponding substrings are used in connection with processing search queries. The strings and substrings may be used to update a search index and/or to modify received search queries for processing.

28 Claims, 12 Drawing Sheets

BEHAVIORAL WORD SEGMENTATION FOR USE IN PROCESSING SEARCH QUERIES

CROSS-REFERENCES TO RELATED APPLICATIONS

This application incorporates by reference for all purposes the full disclosure of application Ser. No. 12/914,934, entitled "Behavior-Driven Multilingual Stemming" filed on Oct. 28, 2010.

BACKGROUND

Information retrieval is often based, at least in part, on words in a language. To provide access to documents responsive to a search query, for example, search engines often identify documents containing some or all of the words of the search query. Effective information retrieval, however, often requires more than simply matching words from search queries to content in documents. If a user, for example, includes the commonly misspelled term "highschool" in a search query, simply matching words of the query to words in documents may cause documents lacking "highschool" but containing "high school" to be overlooked, even though the documents may be relevant to the intent of the user. Similarly, processing a query containing "high school" may overlook documents lacking "high school" but containing "highschool," even if the documents with the misspelling may be relevant to the query. Indeed, many words and combinations of words are commonly misspelled, have multiple legitimate spellings, or otherwise may introduce complexity into systems that retrieve information based at least in part on the words.

Generally, intricacies of various languages can make effective information retrieval a difficult result to achieve. Many languages, such as German, contain many compound words. A user searching for "Damenschuhe" (women's shoes), a combination of "Dame" (lady) and "Schuh" (shoe) may intend to locate women's shoes to purchase from an electronic marketplace. A user searching for "Schuhe," however, may expect to find women's shoes in search results. Other languages may not use spaces or other delimiting characters to separate words. The Japanese word for portable phone, for instance, is "携帯電話." Users searching for 携帯 (portable, common usage for a cell phone), however, may expect to locate items labeled as "携帯電話." One conventional way of handling the above and other issues is to consider components of words (or, generally, character strings) that are also words. Simply breaking up character strings into word components, however, may be ineffective in many cases, sometimes causing search results to be returned that users consider irrelevant or even erroneous. For instance, even though the word "wing" appears in the term "homebrewing," the word "wing" may not be relevant to information sought by a user that has entered "homebrewing" in a search query.

BRIEF DESCRIPTION OF THE DRAWINGS

Various embodiments in accordance with the present disclosure will be described with reference to the drawings, in which.

DETAILED DESCRIPTION

Figure 1:
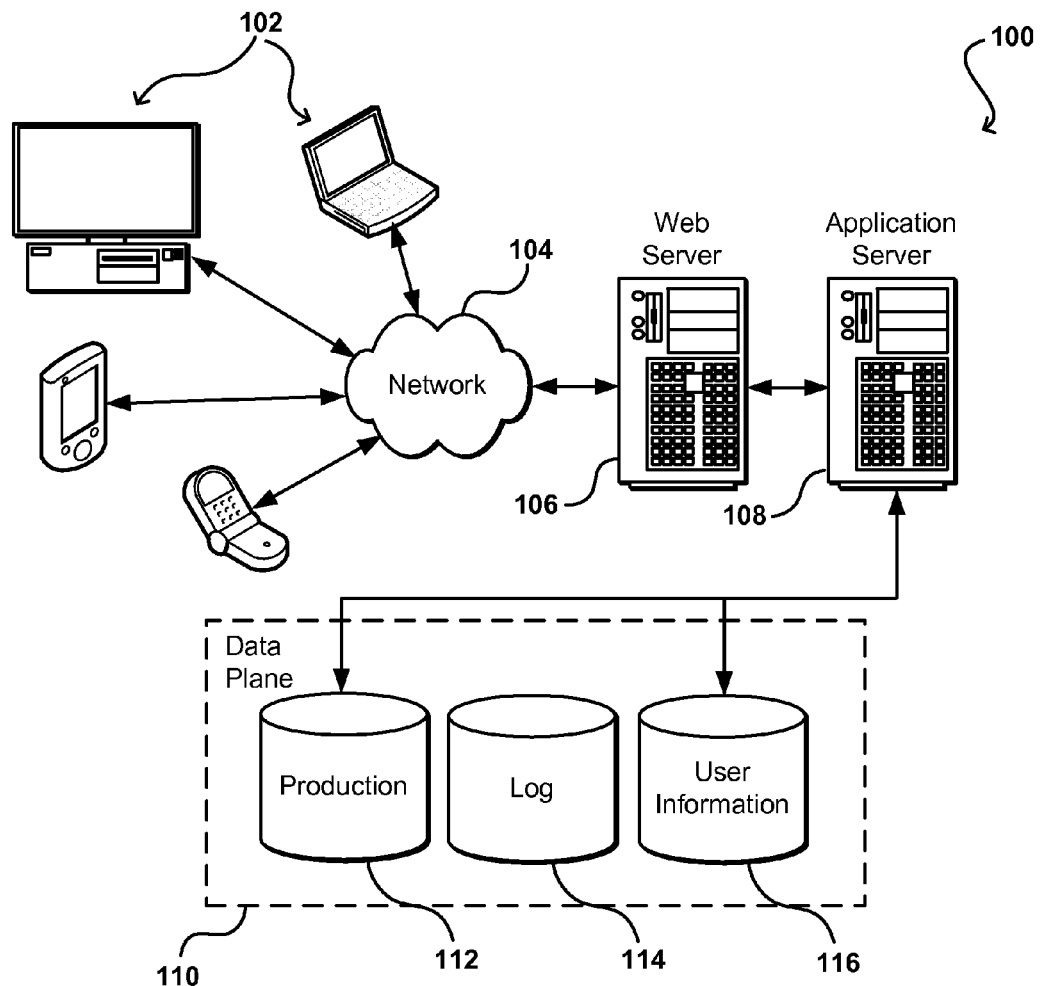
FIG. 1 illustrates an environment in which various embodiments can be implemented.

Systems and methods in accordance with various embodiments of the present disclosure may overcome one or more of the aforementioned and other deficiencies experienced in conventional approaches to processing search queries. In one embodiment, search queries are received from users over a period of time. Such queries are processed and search results are provided to the users. Various behavior data in connection with the submitted queries may be collected and stored in one or more data stores. For instance, for a query, data may be stored that indicates which search results were selected by users. Data regarding user activities other than selection of search results may also be stored. For example, in an embodiment that includes an electronic marketplace, data may be stored that indicates various actions by the users that indicate relevance of items offered for consumption with the search queries. Data may be stored, for example, that includes information regarding whether users consumed (such as purchased) items, whether users viewed landing pages associated with the items, whether users placed items in an electronic shopping cart and the like. In addition, various statistics regarding user activity in connection with search queries may be gathered and stored. As an example, for each query, information may be gathered and stored that indicates the frequency at which users who have submitted the query have performed some action in connection with a result of the query (such as purchase of an associated item offered for consumption). This may be done for multiple results of the query. For any particular search result (or item associated with the search result), a greater frequency may indicate a greater association between the result (or item) and the query.

In many instances, queries received may take several forms. As described above, some users may submit search queries that include a collection of characters and other users may submit search queries that include the collection of characters separated into component parts. In many instances, users that submit such different queries are intending to retrieve the same information. For example, a user that submits a query including the term "homebrewing" may be interested in the same product or products as another user that submits a query that includes "home" and "brewing" separated by a space. To provide optimally relevant sets of search results, embodiments of the present disclosure include techniques for updating search engine indexes and processing search queries that take into account the occurrence of search queries that appear in multiple forms.

In an embodiment, data collected in connection with the receipt and processing of search queries is used to generate a set of candidates for segmentation. A candidate for segmentation may be a string of characters that is constructed from two or more segments (substrings of the string of characters). As an example, the term "homebrewing" may be a candidate for segmentation as it consists of the terms "home" and "brewing." Candidates for segmentation may be identified in various ways. For instance, some candidates may be identified by analyzing received multiple-word queries and checking whether queries have also been received that include components of the multiple word queries combined as a single word. For instance, if a query for "home brewing" has been received, a check may be made whether any queries have been received for "homebrewing" and, if so, then "homebrewing" may be identified as a candidate for segmentation. Conditions on the frequency at which queries have been received may also be taken into account. Continuing the example with "homebrewing," if "homebrewing" has not been received in a query sufficiently often during a time period, the term may not be considered as a candidate for segmentation even though both "homebrewing" and "home brewing" have been received in queries. Other tools may be used in addition or alternatively to identify candidates. For instance, in some embodiments, received search queries are used to build a language model. The language model may indicate that there is significance to certain collections of words being received in search queries. Such collections may be combined to form candidates for segmentation. For instance, if a language model indicates that there is significance to "home brewing" being received in queries, "homebrewing" may be identified as a candidate. Candidates for segmentation may be stored in a table or other data structure that associates the candidates with one or more segmentations into components. The candidate "homebrewing," for example, may be stored in a manner that associates the term with "home brewing." Candidates may also be associated with more than one segmentation. For instance, "home brewing kit" may be associated with "homebrewingkit," "homebrewing kit," "home brewingkit," and "home brewing kit."

Some of the candidates for segmentation may not be suitable for segmentation. Users that include "blackberry" in search queries, for example, may generally be interested in electronic devices while users that include "black berry" in search queries may be generally interested in fruit. Accordingly, in an embodiment, candidates for segmentation and their segmentations into components (such as words or other tokens) are analyzed to refine the set of candidates. Analysis of the candidates and their segmentations may be analyzed in various ways and combinations thereof. In an embodiment, analysis of the candidates and their segmentations includes, for a candidate and a segmentation of the candidate, submitting both the candidate and the segmentation to a search engine and comparing the results. If there is insufficient overlap between the results of submitting the candidate and the results of submitting the segmentation, the candidate may be removed from the set of candidates.

Analysis of the candidates and their segmentations may also include the use of user behavior data. In embodiment, search queries submitted in connection with interaction with an electronic marketplace are associated with items offered for consumption based at least in part on user behavior, such as behavior described above. The query "home brewing kit," for example, may be associated with kits for brewing at home as well as books and videos on the subject since users who submit "home brewing kit" in search queries generally purchase such items (and/or exhibit other behaviors indicative of interest in such items) when purchases are made. Accordingly, in an embodiment, a set of items associated with a candidate for segmentation may be compared with a set of items associated with a segmentation of the candidate. If the sets are insufficiently similar, then the candidate may be removed from the set of candidates. As noted, the strength of the association between an item and a query may be based at least in part on the frequency at which one or more behaviors are exhibited by users. Therefore, items whose association with a query is sufficiently strong may be considered, in an embodiment.

Once a set of candidates has been refined, in an embodiment, the refined set of candidates is used to update a search engine index. Updating the search engine index may be performed in various ways. In an embodiment, the refined set of candidates is used to process documents that are indexed. For example, if a document contains a candidate from the refined set, the document may be associated with the components of a segmentation of the candidate in the index. The document may also be associated with the candidate in the index. In this manner, the index may be used to locate relevant documents regardless of whether users submitted the candidates or segmentations of the candidates in search queries. Similarly, because of the procedures used to refine the candidates, for candidates that were removed from the refined list, users who submit candidates in search queries and users who submit segmentations of the candidates are more likely to respectively receive relevant documents.

A refined set of candidates may also be used during the processing of search queries. For example, when a search query is received, a table or other data structure that associates each candidate with at least one segmentation of the candidate may be used to determine whether one or more components of the search query should be split into component parts. For example, if "homebrewing" is received as part of a search query, a table may be referenced to determine whether to split the term into "home" and "brewing." If "homebrewing" is in the table, then "homebrewing" may be replaced with "home brewing" in the search query before the search query is processed by the search engine. Similarly, a table or other data structure may be used to determine whether components of search queries should be combined for processing by a search engine.

As noted, while many of the illustrative examples described herein include words and compositions of words in the English language, the various processes described herein may be used, and adapted as necessary, for use with various languages. For instance, techniques described and suggested herein may be used in connection with language that do not use spaces to separate words, which may be represented by a single character. Generally, the techniques of the present disclosure may be used whenever, in connection with processing search queries, it may be desirable to split strings of characters into component parts. Further, for search engines that process multiple languages, sets of strings (such as the refined set of candidates described above) may be stored for multiple languages such that queries received in multiple languages are processed accordingly.

Such approaches can also be utilized advantageously for various search services and/or shared resource environments. For example, FIG. 1 illustrates an example of an environment 100 for implementing aspects in accordance with various embodiments. As will be appreciated, although a Web-based environment is used for purposes of explanation, different environments (e.g., local network or cloud-based environments) may be used, as appropriate, to implement at least portions of the various embodiments. An electronic client device 102 can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a plurality of resources, servers, hosts, instances, routers, switches, data stores, and/or other such components defining what will be referred to herein as a data plane 110, although it should be understood that resources of this plane are not limited to storing and providing access to data. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides admission control services in cooperation with the data store, and is able to generate content such as text, graphics, audio, and/or video to be transferred to the user, which may be served to the user by the Web server in the form of HTML, XML, or another appropriate structured language in this example. In some embodiments, the Web server 106, application server 108 and similar components can be considered to be part of the data plane. The handling of all requests and responses, as well as the delivery of content between the client device 102 and the application server 108, can be handled by the Web server. It should be understood that the Web and application servers are not required and are merely example components, as structured code can be executed on any appropriate device or host machine as discussed elsewhere herein.

The data stores of the data plane 110 can include several separate data tables, databases, or other data storage mechanisms and media for storing data relating to a particular aspect. For example, the data plane illustrated includes mechanisms for storing production data 112 and user information 116, which can be used to serve content for the production side. The data plane also is shown to include a mechanism for storing log data 114, which can be used for purposes such as reporting and analysis. It should be understood that there can be many other aspects that may need to be stored in a data store, such as for page image information and access right information, which can be stored in any of the above listed mechanisms as appropriate or in additional mechanisms in the data plane 110. The data plane 110 is operable, through logic associated therewith, to receive instructions from the application server 108 and obtain, update, or otherwise process data, instructions, or other such information in response thereto. In one example, a user might submit a search request for a certain type of item. In this case, components of the data plane might access the user information to verify the identity of the user, and access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, enable the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

An environment such as that illustrated in FIG. 1 can be useful for various content providers or other such entities, wherein multiple hosts and various types of resources might be used to perform tasks such as locating and/or serving content, authenticating users, allocating resources, or performing any of a number of other such tasks. Some of these hosts may be configured to offer similar functionality, while other servers might be configured to perform at least some different functions. The electronic environment in such cases might include additional components and/or other arrangements, such as those discussed in detail below.

As discussed above, various systems and methods in such an environment can generate, and utilize, behavior-driven segmentation databases for search systems and services, as well as for other such purposes. Such a database can enable a searching system, for example, to provide users with accurate results based upon one or more keywords the user has entered into a search query. In particular, various embodiments enable the determination of the appropriate segmentation for words of the search query, where the appropriate segmentation can be determined based at least in part upon the monitored behavior of various users.

Figure 2:
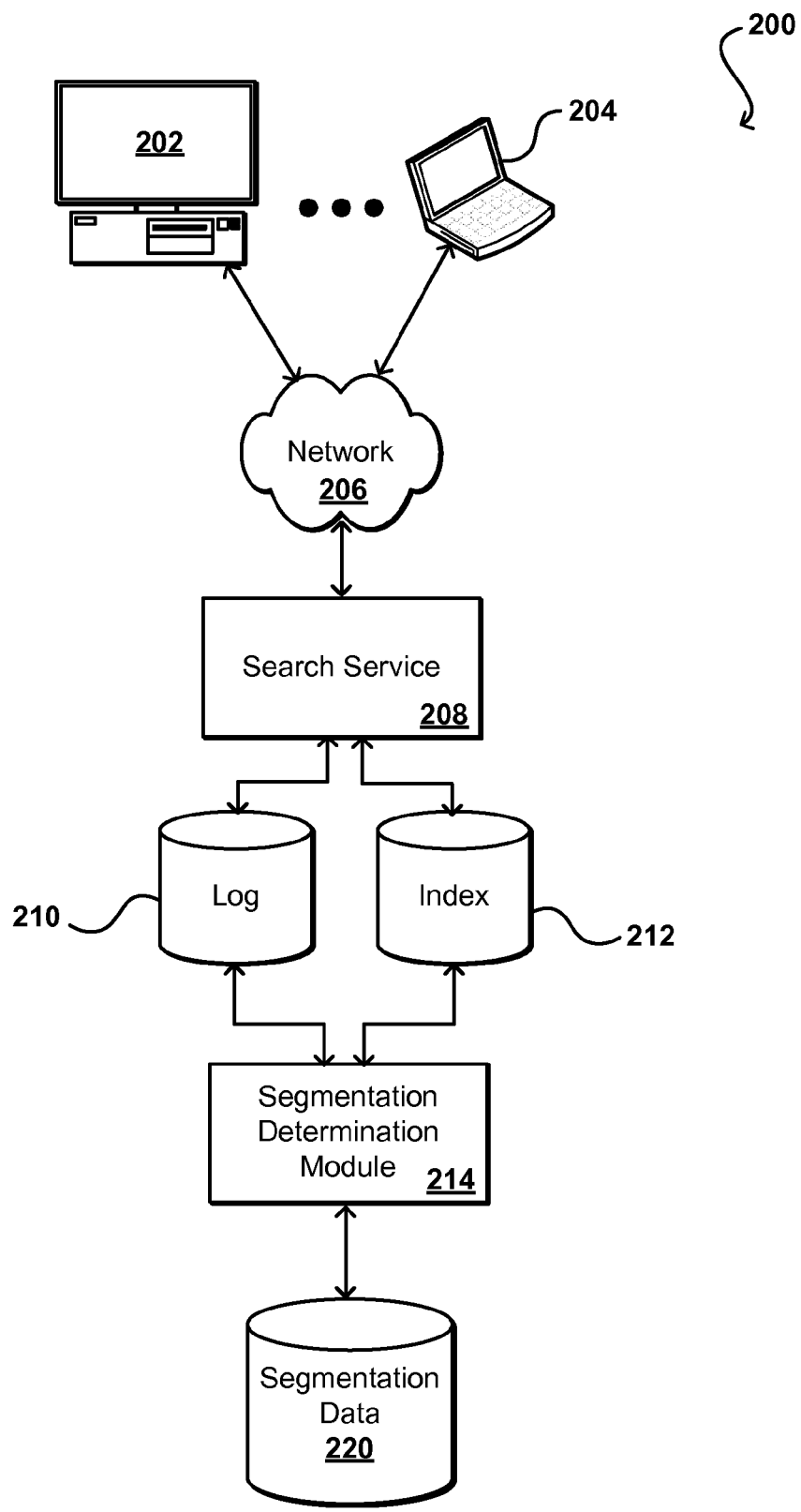
FIG. 2 illustrates an example environment in which a multilingual, behavior-based segmentation database can be generated in accordance with various embodiments.

FIG. 2 illustrates an example configuration 200 of components of an environment such as that described with respect to FIG. 1 that can be used to generate a segmentation database 220 in accordance with various embodiments. In this example, a number of queries can be received over at least one appropriate network 206, such as the Internet or an ethernet, to at least one search service 208 or similar component or system. It should be understood however, that other examples are possible that do not utilize such a network. The queries can be received from any appropriate user or client device 202, 204, such as a computer, smart phone, video game console, and the like. The search service can utilize at least one search index 212 to attempt to locate results that match the received queries, and provide those results back to the respective client device (or other appropriate location) in response to the query. The search service, or another system or service associated with the search service, can monitor the actions of a user with respect to the provided search results. For example, the service can track which results the user accesses, such as by clicking or otherwise selecting, as well as other actions, such as which search results resulted in a user purchase or other such transaction. Any such information (e.g., behavioral data) can be associated with the query terms that resulted in the search results, and this information (and any other appropriate information) can be stored to a log database 210 or other appropriate data store for subsequent analysis.

After a minimum amount of behavioral data has been captured, a segmentation determination module 214 or other such component can attempt to utilize this and potentially other types of information to generate and/or update a segmentation database 220. An illustrative example of a segmentation database is described below in connection with FIG. 8. The segmentation determination module 214, or another component (not pictured) may update the index 212 according to the data in the segmentation database 220. For example, if the segmentation database indicates that a word (or other stream of characters) should be segmented into component parts, documents may be indexed in the index 212 accordingly. For instance, a document associated with a keyword "homebrewing" may be indexed by "home" and "brewing," should the data in the segmentation database 220 indicate such. The document may also be indexed by "homebrewing" to allow for instances when users include "homebrewing" in search queries instead of the components "home" and "brewing."

Figure 3:
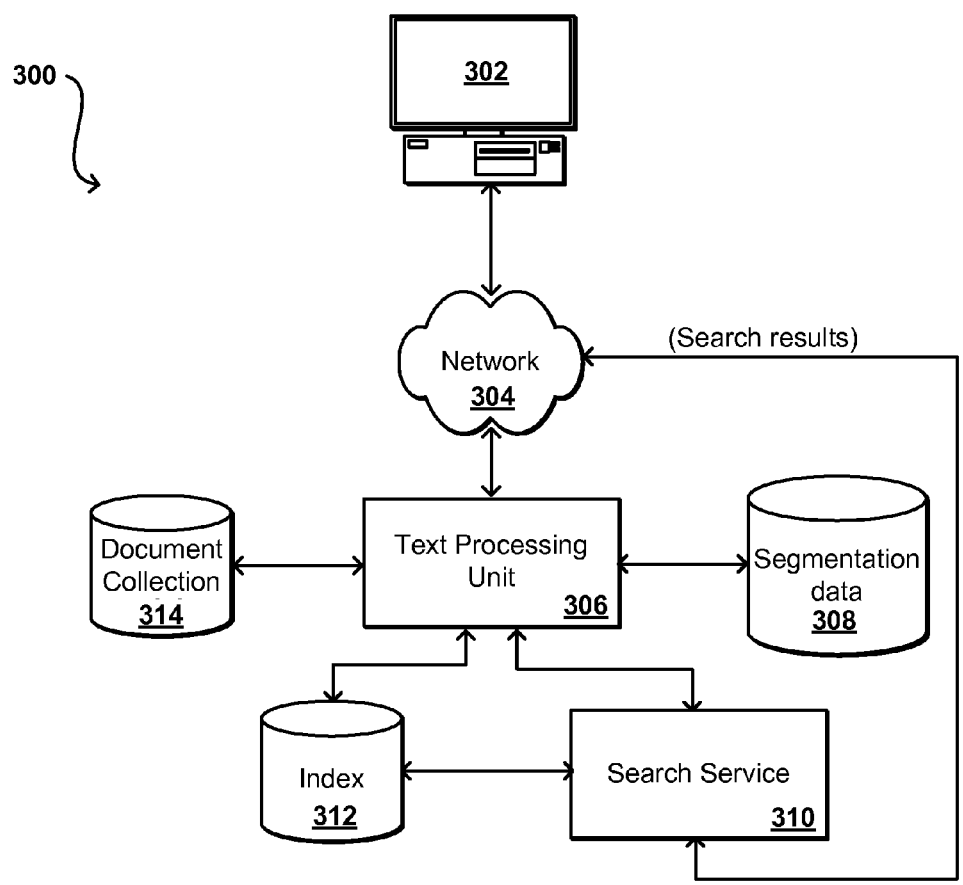
FIG. 3 illustrates an example environment in which a multilingual, behavior-based segmentation database can be used for indexing and for query matching in accordance with various embodiments.

FIG. 3 illustrates an example configuration 300 of components for utilizing such a segmentation database 308 in accordance with various embodiments. It should be understood that this can comprise a separate system or part of a common system with at least a portion of the components illustrated in FIG. 2. In addition, this example uses similar components to update the index 312 and process queries, but in other embodiments these functions can be at least partially performed by separate systems or services.

In this example, a component or service such as a text processing unit 306 can assist in generating and/or updating a search index 312, or other such index or grouping of words or terms. As discussed above, the amount of content in a document collection 314 can be continually increasing, with a corresponding increase in new terminology that must be processed and indexed. At certain times, such as hourly, daily, monthly, randomly, or at any other appropriate time(s), even continuously, a text processing unit can crawl or otherwise process new and/or updated documents in the document collection 314 and extract terms to be used to index those documents. The text processing unit can perform any of a number of text processing procedures, such as may include tokenization, stop wording, segmentation, and stemming. For example, a document might first be tokenized to break the query string into a series of tokens, each token corresponding to a sequence of characters grouped as a useful semantic unit, discarding characters such as certain punctuation, symbols, etc. Once the sentences (or other groupings of text) are tokenized, the tokens can be analyzed for stop words, in order to filter out words that might cause problems with, or otherwise negatively impact, an indexing and/or search procedure. Stop words can include, for example, "a," "an," "of," "the," and other such words as known in the art. As with other processes discussed herein and variations thereof, the above actions may be performed in a different order than explicitly described.

After the documents are tokenized and filtered for stop words, for example, the remaining tokens can be processed using a segmentation procedure in accordance with various embodiments. As discussed in more detail elsewhere herein, the text processing unit 306 can look up or reference the data in the segmentation database. Tokens may be segmented by the text processing unit 306 when the data in the segmentation database indicates that such should be done. Segmented versions of the tokens can be added to the index 312 and associated with the respective document in the document collection 314.

A similar set of components can be used to provide search results in response to user queries. In FIG. 3, a query can be received from a client device 302 over a network that is intended for a search service. Although in this example the request is shown to be directed to the text processing unit before the search service, it should be understood that other flows are possible as well, such as to direct the request first to the search service, or where the text processing unit is part of the search service, etc. The query can be directed to the text processing unit 306, wherein the unit can perform at least some similar steps on the query, as may include tokenization, stop wording, segmentation, and stemming. The text processing unit can utilize the segmentation database 308 in order to utilize the user behavior-based information in selecting appropriate word segmentations. The remaining terms of the query, including processed tokens, terms, stems, or other such forms, then can be sent (or returned) to the search service 310, which can compare those forms with the information in the search index 312 to attempt to determine matching documents and provide a list of search results to provide back to the client device 302 across the network 302. For example, a query for "birdhouses for children" may be tokenized into the tokens "birdhouses," "for," and "children." The token "birdhouses" may be stemmed to "birdhouse," and "birdhouse" may be segmented to "bird house." The token "for" may be identified as a stop word and discarded and the token "children" may be stemmed to "child." The tokens "bird" "house" and "child" may then be used to process the query.

The text processing unit 306 may tokenize the input query by breaking the query into tokens using explicitly demarked token boundaries, such as spaces in Western languages. For languages that do not explicitly demark token boundaries with spaces, such as Japanese and Chinese, an appropriate method for identifying tokens may be applied. Existing methods include using a tokenization dictionary and extracting tokens based on the longest match found in the tokenization dictionary, or training a statistical model to maximize the likelihood of generating a tokenization based on a frequency weighted tokenization dictionary. The system described here can be used in conjunction with an existing tokenization approach for languages that do not have explicit token demarcation by suggesting likely candidates for inclusion in existing dictionaries used in tokenization, or the process described herein can be used to tokenize text without an existing tokenization system.

It should be noted that the representations of the systems described in connection with FIGS. 2 and 3 (and elsewhere) are simplified for the purpose of illustration and that variations are considered as being within the scope of the present disclosure. For instance, components of systems represented in application Ser. No. 12/914,934, entitled "Behavior-Driven Multilingual Stemming" filed on Oct. 28, 2010 may be included in various embodiments. Such components may be combined with components described herein (and variations thereof) and/or included as additional components.

Figure 4:
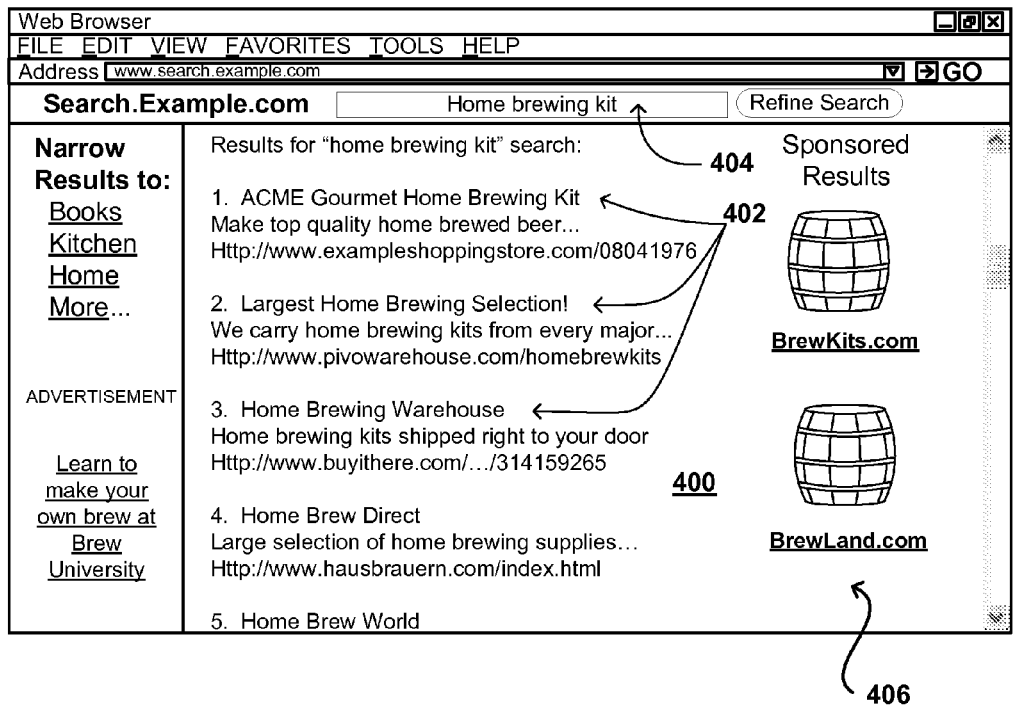
FIG. 4 illustrates an example web page showing search results that are responsive to a user-submitted search query in accordance with various embodiments.

FIG. 4 shows an illustrative example of a web page 400 used to display search results in response to a user query in accordance with an embodiment. The web page 400 may be returned (or may include information that is returned) from a search service, such as described in connection with FIG. 3. In this example, the web page 400 includes a plurality of search results 402 in a central area of web page 400. As shown in this example, each of the various search results 402 may include information about each search result and a hyper-link to a landing page corresponding to each search result. The information about each search result may be text and/or other content from a web page corresponding to each search result. The set of search results 402 shown on the web page 400 may have been generated by a search engine in response to submission of a search query submitted by a user, such as by using a text entry box 404 of a search engine graphical interface provided by the search engine. For example, as shown in FIG. 4, a user has submitted a search query consisting of the terms "home," "brewing," and "kit."

The web page 400 may include other features, such as advertisements 406, also referred to as sponsored results, and other interface elements which may be utilized by users for the purpose of navigation. It should be noted that the web page 400 is provided for the purpose of illustration and that a wide range of variations are considered as being within the scope of the present disclosure. For instance, for the purpose of illustration, various embodiments are described in connection with an environment in which users use a search engine to submit search queries typed in or otherwise inputted by users in order to retrieve search results provided by the search engine. However, various embodiments of the present disclosure also apply to other environments, such as any environment in which information retrieval techniques are used. For example, any environment in which a search engine is utilized may make use of various embodiments of the present disclosure.

Figure 5:
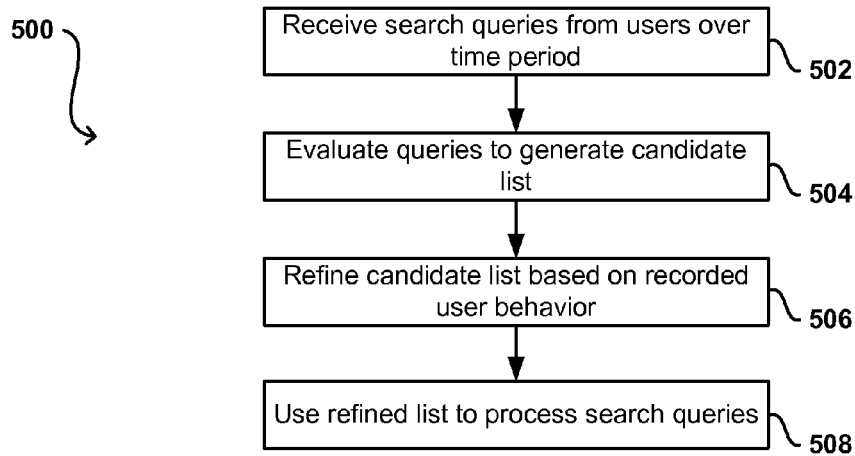
FIG. 5 illustrates example steps for processing search queries in accordance with various embodiments.

As noted above, various embodiments of the present disclosure incorporate the use of processes for processing search results. Accordingly, FIG. 5 shows a flowchart for an illustrative example of the process 500 for processing search results in accordance with an embodiment. Some or all of the process 500 (or any other processes described herein or variations and/or combinations thereof) may be performed under the control of one or more computer systems configured with executable instructions and may be implemented as code (e.g., executable instructions, one or more computer programs, one or more applications) executing collectively on one or more processors, by hardware, or combinations thereof. The code may be stored on a computer-readable storage medium, for example, in the form of a computer program comprising a plurality of instructions executed by one or more processors. The computer-readable storage medium may be non-transitory.

In an embodiment, search queries are received 502 from users over a period of time. The received search queries may be stored in a data store of or associated with a search engine and may be associated with other information, such as user behavior subsequent to search query submission in accordance with an embodiment. The time period may be the order of months or generally any time period over which search queries are received. In an embodiment, the process 500 includes evaluating 504 the received search queries to generate a list of candidate words for splitting. In general, as will be discussed in more detail below, the candidate words may be one or more words for which a determination has been made that it is potentially better to split the words into component parts. As one example, it may have been determined that a search query for "Damenschuhe" (ladies' shoes) should be split into the components "Dame" (lady) and "Schuhe" (shoe). As noted, search queries may include other combinations of characters and not necessarily words in the English-language sense of the word. Some languages, for example, may not use spaces to separate components, where the components may function similar to English-language words. A search query for "携帯電話" (keitaidenwa, portable phone), for example, contains the component "携帯" (keitai, portable). In common usage people refer to cell phones in Japan by only the first word, 携帯 (keitai, portable) and do not often include the full term 携帯電話 (keitaidenwa, portable phone.) Thus, a "word" as used herein may be a combination of characters which, depending on context, may or may not be separated from other words by a space. If data regarding past search queries indicates that users, as a whole, have submitted searches for both words consisting of multiple components and the components individually, such words may be added to the candidate list. Language models or other devices may also be used in addition or as an alternative to determine whether to add words to a candidate list. For instance, a language model may indicate that there is a higher probability that "home" and "brewing" occur consecutively in a search query than nonconsecutively, therefore indicating that "homebrewing" is a potential candidate for segmentation.

In an embodiment, once a candidate list is generated, the candidate list is refined 506 based at least in part on recorded user behavior. As discussed in more detail below, the candidate list may be refined by removing one or more candidates from the candidate list. Data indicative of past user behavior of users that have submitted queries on the candidate list may be used to determine whether words should be removed from the candidate list. If users that have submitted components of a word individually as search queries purchase, view, place in an electronic shopping cart, or otherwise exhibit behavior indicative of an association with an item (such as an item offered for consumption in an electronic marketplace), and if users that have submitted the components of the word together exhibit similar behavior, it may be determined that the word should remain on the candidate list. As an example, if a set of items purchased by users that submitted "homebrewing" as a search query is substantially similar to the set of items purchased by users that have submitted queries containing both "home" and "brewing" (separated by a space), "homebrewing" may remain on the candidate list. Similarly, if the set of items purchased by users that submitted "blackberry" as a search query is dissimilar from the set of items purchased by users that submitted "black" and "berry" (separated by a space) as search queries, "blackberry" may be removed from the candidate list. As noted, other user behaviors may be used to refine the candidate list, such as comparing the set of search results selected by users who submit a word as a search query to the set of search results selected by users who submit search queries having the word segmented. A Jaccard index or other way of measuring set similarity may be used.

Once the candidate list is refined in an embodiment, the refined list is used 508 to process search queries. The refined list may be used in various ways, some of which are described in detail below. For example, the refined list may be used to convert single words into multiple components in order to improve search results. The refined list may also be used to update an index of a search engine according to the refined list.

The actions described above in connection with FIG. 5 and, generally, in connection with any process described herein, or variation thereof, may be performed in a manner differently than illustrated. For example, FIG. 5 illustrates receiving search queries from users over a time period, which may be performed during the performance of other actions of the process 500. Generally, many actions of the various processes described herein may be performed in parallel, even though the actions are not illustrated in the figures as such. In addition, processes may include additional actions and, in some instances, fewer actions than illustrated. Some actions, such as actions involving processing, evaluating, storage, analysis, and others, may be performed by multiple devices. Various methods for distributed processing and/or storage may be utilized, especially when the amount of data involved is relatively large.

Figure 6:
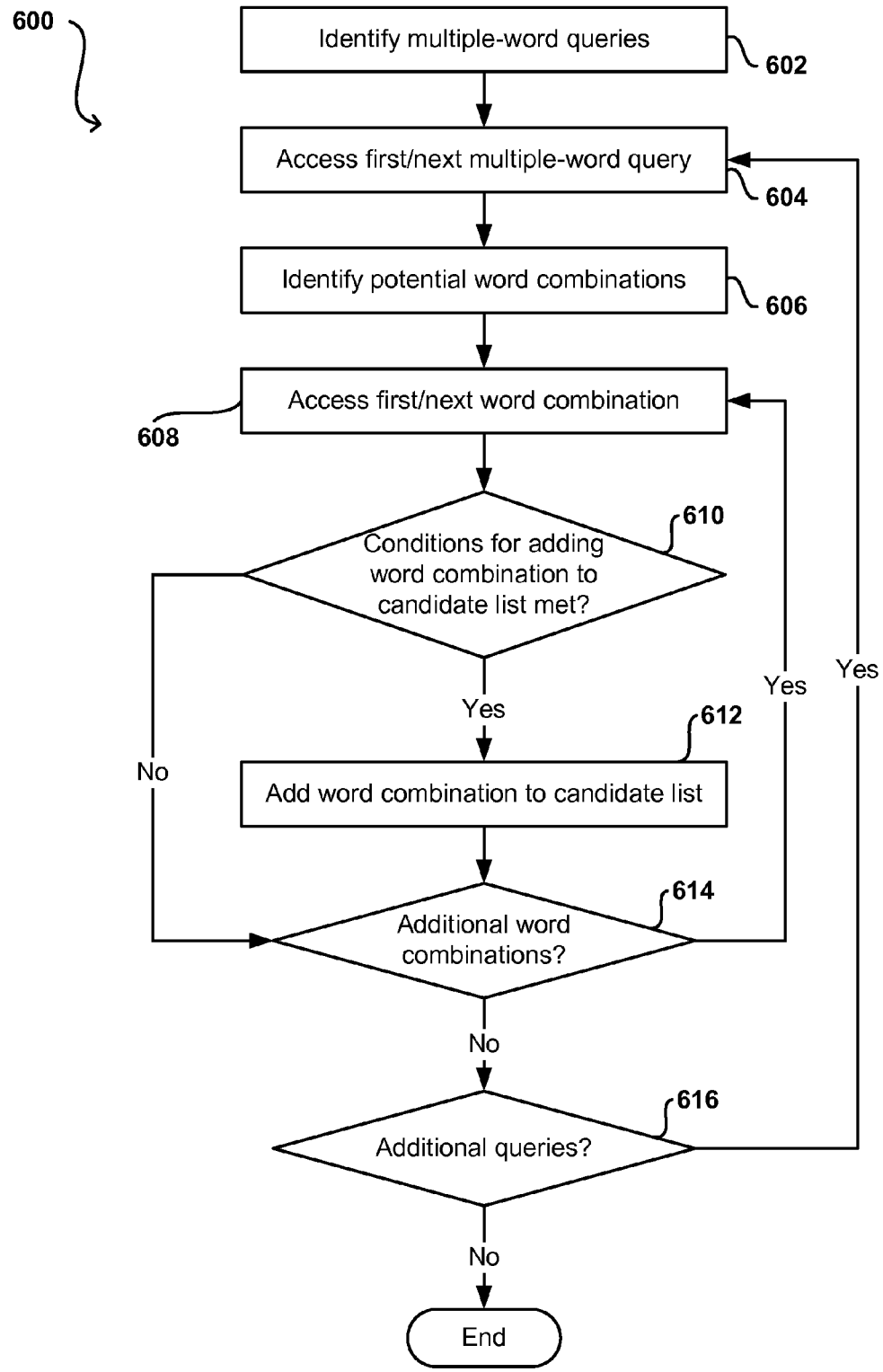
FIG. 6 illustrates a process for generating a list of a candidate word for splitting in accordance with various embodiments.

FIG. 6 shows a flowchart of an illustrative example of a process 600 for generating a candidate list of words that may be split. The process 600 in an embodiment includes identifying multiple word queries that have been received as search queries from users over a period of time. A data store of a search engine, for example, may be analyzed to generate a list or other data structure that identifies multiple word search queries that have previously been submitted. In the embodiment, a first multiple word query is accessed 604 for analysis. Analyzing the first multiple word query may include identifying 606 potential word combinations from the multiple word query. As one example, if a search query consists of two words, there may be one potential word combination that is a single word consisting of the combined words. For instance, if the search query was "bird house," a potential word combination for the search query may be "birdhouse." It should be noted that other methods of identifying candidate words may be used. For example, one or more rule sets may be applied to queries when applicable. For instance, application of a rule set to queries in German containing "X für Y" where X and Y represent words, in German may identify YX as a candidate. Thus receipt of queries for "Schuhe für Damen" may result in "Damenschuhe" being identified as a candidate. Similarly, for Japanese, application of a rule set to queries of the form "X の A" may result in words of the form XA being identified as candidate.

Returning to the process 600, in an embodiment, once the potential word combinations have been identified 606, the first word combination is accessed 608 for analysis. Analysis of the accessed word combination may include determining 610 whether one or more conditions for adding the word combination to the candidate list are met. In an embodiment for one or more conditions for adding the word combination to the candidate list includes determining whether the word combination was previously submitted as a search query with sufficient frequency. Continuing the example with the search query "bird house," a condition for the word combination "birdhouse" may be that the single word "birdhouse" was submitted as a search query with sufficient frequency. The frequency may be, for example, a minimum percentage of the total number times the search query with the space was submitted. Another example condition for adding the word combination to the candidate list may be that the word combination exists in an index of search engine. Generally, any suitable condition or combination of conditions may be used.

If the one or more conditions for adding the word combination to the candidate list are met, then in an embodiment, the word combination is added 612 to the candidate list in an appropriate position. The word combination may be, for example, added to the end of the candidate list or may be inserted into the candidate list in any suitable position. Once the word combination has been added 612 to the candidate list, or it has been determined 612 that one or more conditions for adding the word combination to the candidate list are not met, then in an embodiment a determination is made whether there are additional word combinations. A search query consisting of three words, for example, may correspond to three potential word combinations: the first two words of the search query, the last two words of the search query and all three words of the search query. An example of a three-word search query and the potential word combinations thereof are described below in connection with FIG. 7.

If a determination is made 614 that there are additional word combinations for the accessed multiple word query, then in an embodiment, the next word combination is accessed 608 and a determination is made 610 whether one or more conditions for adding the next word combination to the candidate list are met. If, however, a determination is made 614 that there are no additional word combinations, then a determination is made 616 whether there are additional queries to analyze. If it is determined that there are no additional queries, for example, when all the queries have been processed, then the process 600 may end or may be repeated such as at a later time. If there are additional queries, in an embodiment, potential word combinations of the accessed next multiple word query are identified and analyzed, such as in a manner described above.

As with all processes described herein, variations are considered as being within the scope of the present disclosure. For example, FIG. 6 illustrates a process where multiple-word queries are used to identify queries where at least some of the words have been submitted as combined. Other processes may be used to identify potential candidates for splitting. For example, strings of queries may be identified as candidates for splitting when one or more substrings are found in a dictionary, which may be a list or other data structure of words of a language, such as English. The dictionary may also include common misspellings as well as words accepted as being part of the language. As an example of using a dictionary, the string "homebrewing" may be identified as a potential candidate because substrings include common English words such as "home," "brew," "wing," "brewing," as well as some other words. As noted elsewhere herein, language models may be used to identify candidates. Generally, any process for identifying candidates may be used.

Figure 7:
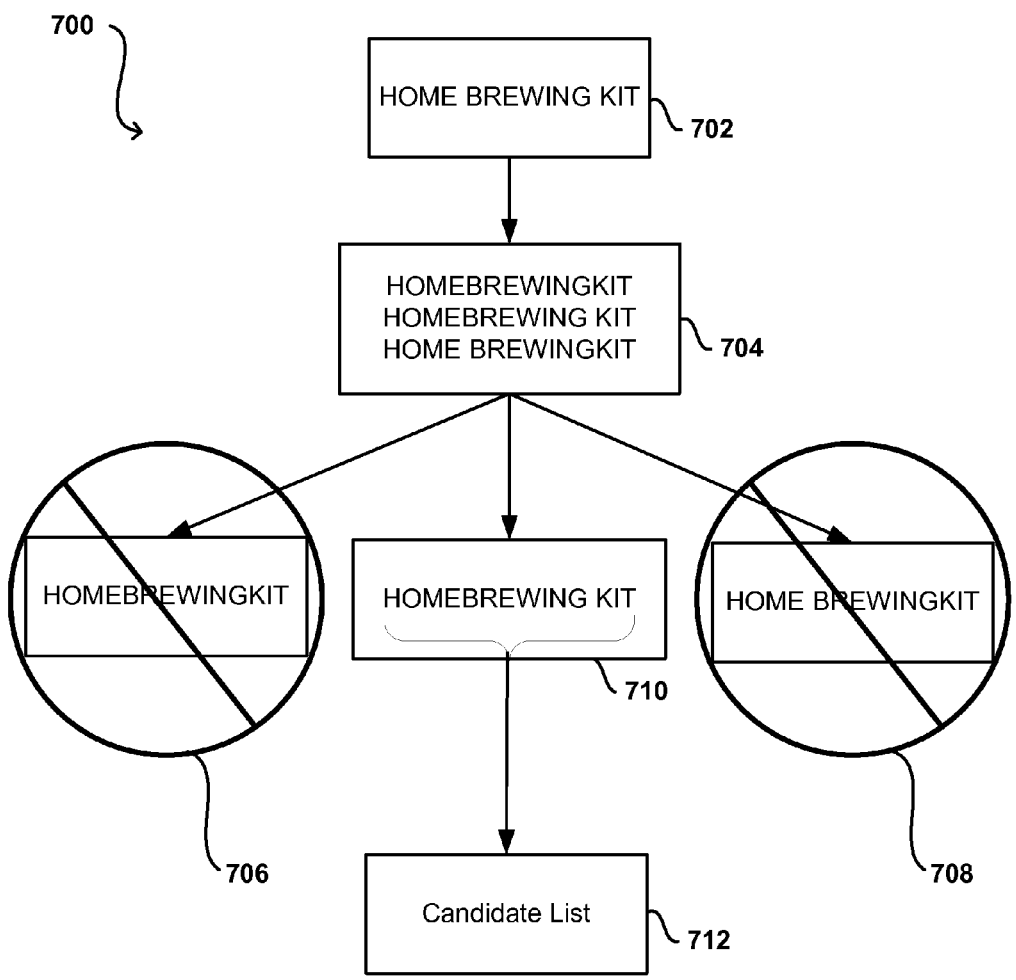
FIG. 7 is a graphical representation of several steps of the process shown in FIG. 6.

FIG. 7 provides an illustrative example of how candidate words may be added to a candidate list in accordance with an embodiment. In particular, FIG. 7 shows a diagram 700 showing various steps in an example process. Initially, a multiple word query for home brewing kit is received 702. From the multiple word query home brewing kit, a plurality of candidate word combinations are determined 704. For example, all three words of the search query may be combined into a single word "homebrewingkit." As another example, the first two words may be combined and separated from the third word resulting in "homebrewing kit." And lastly, the last two words of the search query may be combined and separated by a space from the first word to get "home brewingkit." It should be noted that other possible combinations may also be formed in accordance with various embodiments depending on how the processes are being performed in specific embodiments. For example, a potential combination may include "wing kit" because the components "wing" and "kit" appear consecutively. In some embodiments, it may be desirable to combine words which are not consecutive in the search query. For example, a possible combination may be homekit or kithome or brewinghome or kitbrewing and other possible combinations of characters from the multiple word search query. Such determination of potential word combinations may be useful, for example, when processing queries submitted in languages in which word order is less significant than in English.

Returning to the diagram 700 of FIG. 7, the potential word combinations are analyzed to determine whether they should be added to the candidate list. For example, as shown in FIG. 7, a determination is made 706 that the potential combination consisting of all three words together as one word "homebrewingkit" is not to be added to the candidate list. The reason may be, for example, that no user queries have been received for "homebrewingkit" as one word or, if one or more queries have been received, they have not been received with sufficient frequency. A determination is also made 708 that the potential "home brewingkit" is not to be added to the candidate list. However, with the potential combination, "homebrewing kit," a determination 710 that the potential combination of "home" and "brewing" together as one word should go to the candidate list and the pair "homebrewing kit" and "home brewing kit" are added to the candidate list 712 accordingly. It should be noted that words not involved in the segmentation may be discarded before addition to a candidate list. For instance, in the example of this paragraph, the word "kit" may be discarded and the pair of "homebrewing" and "home brewing" may be added to the candidate list.

Figure 8:
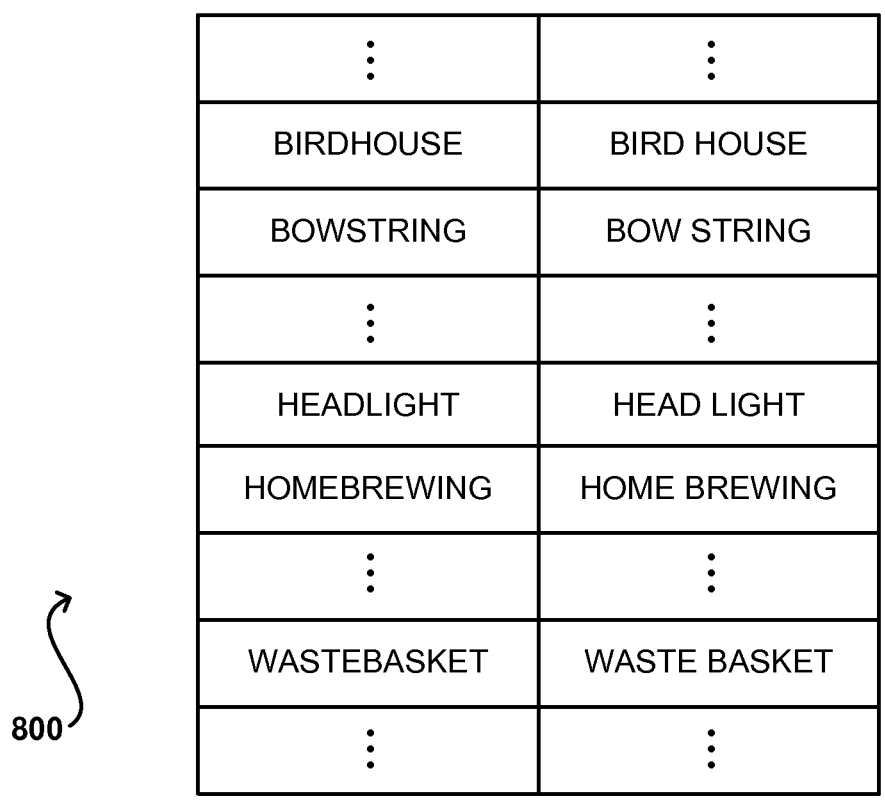
FIG. 8 is an illustrative example of a data structure that may be used in accordance with various embodiments.

FIG. 8 shows an illustrative example of a table 800 of candidate pairs which is an illustrative example of a candidate list. In particular, the entries in the left-hand column of the table 800 correspond to word combinations (i.e. combinations of string components) that form a candidate list. For instance, in this illustrative example, the left-hand column includes entries for "birdhouse," "bowstring," "headlight," "homebrewing," and "wastebasket." Also shown in FIG. 8, the table 800 associates the word combinations with splits (segmentations) of those word combinations; that is, the table associates each entry of the left-hand column with one or more entries of the right-hand column, where the entries of the right-hand column contain multiple words used to form the entries of the left-hand column. As one example, the left-hand column, as noted, includes an entry for the term "birdhouse" as one word. The table 800 associates in the right-hand column a multiple word query with the single word "birdhouse." In this example, the multiple word query is "bird house." As shown, each entry in the left-hand column corresponds to an entry in the right-hand column. It should be noted that in various embodiments, the table or other data structure may associate a word combination with one or more possibilities of splitting up the query. Additional columns or rows may be added to accommodate word combinations having multiple possibilities for segmentation.

Figure 9:
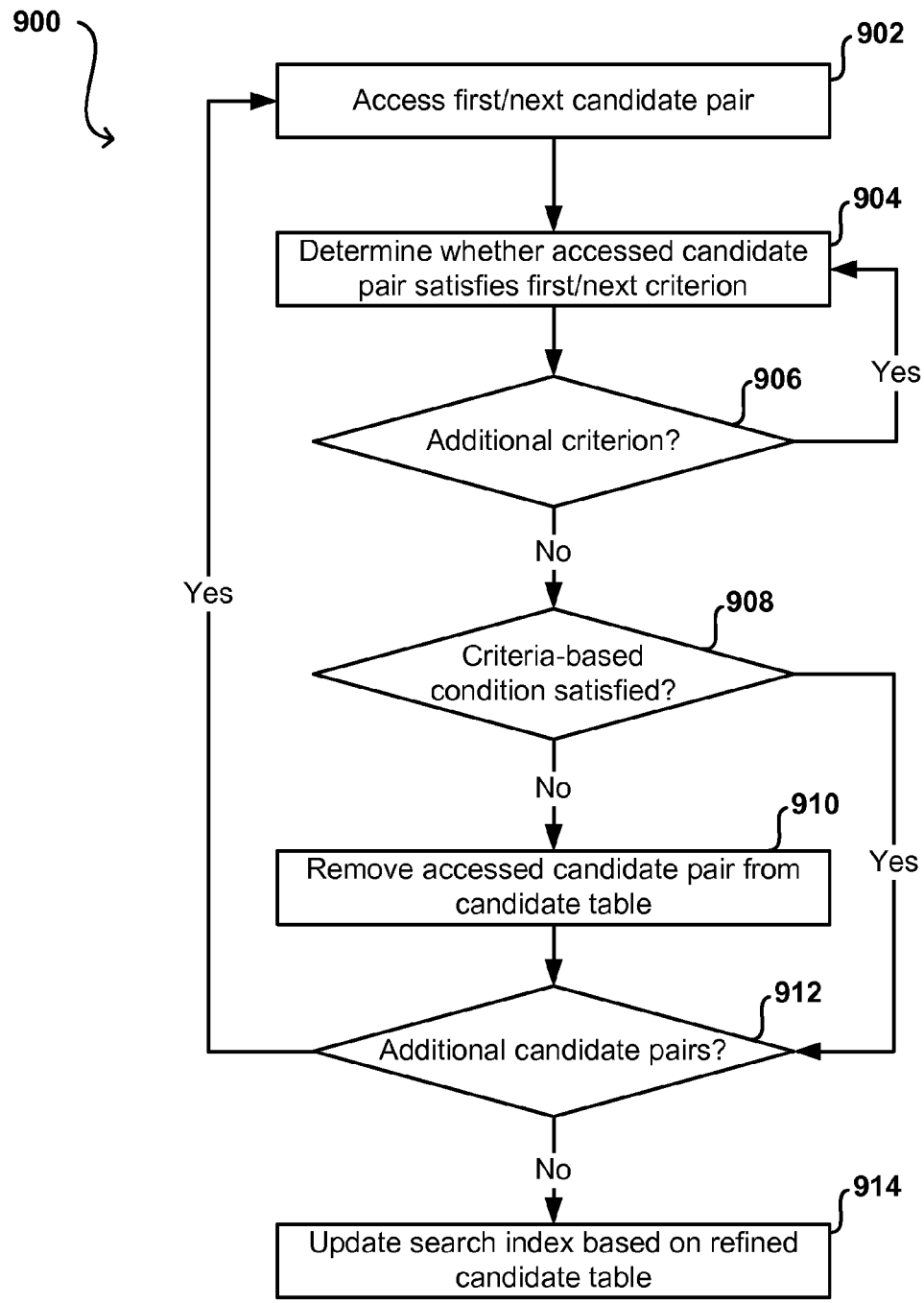
FIG. 9 illustrates example steps of a process for refining a list of candidate words for splitting in accordance with various embodiments.

FIG. 9 shows a flowchart for an illustrative example of a process 900 for refining a candidate list, such as a candidate list constructed in accordance with the embodiment shown above in connection with FIG. 8. Performance of the process 900, in an embodiment, includes accessing each candidate in the candidate list, analyzing the candidate and determining whether to remove the candidate from the list. In this particular example, for instance, process 900 includes accessing 902 a first candidate pair. A candidate pair, as used herein, may be a word combination (combination of characters) with the components that form that word combination. A candidate pair may correspond to rows of a table, such as the table 800 shown in FIG. 8, for example. The pair "headlight" and the collection of "head" and "light" are an example of a candidate pair.

In an embodiment, a determination is made 904 whether the accessed candidate pair satisfies a first criterion for removal from the candidate list. A determination is then made 906 whether there are additional criteria to be applied and if there is an additional criterion; then a determination is made whether the access candidate pair satisfies the next criterion. In this manner, a plurality of criteria may be applied against the candidate pair where the criteria collectively indicate whether a word combination should be split into two or more components. Some illustrative examples of criteria that may be used are discussed both above and below. If a determination is made 906 that there is no additional criterion, then a determination is made 908 whether a criteria-based condition is satisfied. The criteria-based condition may be a condition structured such that, when satisfied, the criteria collectively indicate that a word combination should be split into two or more components. The criteria-based condition may be, for example, that all the criteria are satisfied. The criteria-based condition may also be other conditions. For instance, the criteria-based condition may be that a minimum number of criteria are satisfied or that particular subsets of a set of criteria are satisfied. Generally, any way of determining from a set of criteria applied to a candidate pair may be used.

If a determination is made 908 that the criteria-based condition is not satisfied, in an embodiment, the accessed candidate pair is removed from the candidate list. In an embodiment that utilizes the table such as the table shown in FIG. 8, a corresponding row from the table may be deleted. Other data structures may be modified accordingly. If, however, it is determined 908 that the criteria-based condition is satisfied, then a determination is made 912 whether there are additional candidate pairs. If utilizing a table such as the table 800 shown in FIG. 8, for example, the determination will be positive if all rows of the table have not been processed.

If it is determined at 912 that there are additional candidate pairs to process, then, in an embodiment, the next candidate pair 902 is accessed and processed such as in the manner described above. In particular, determinations may be made whether one or more criteria apply to the accessed candidate pair and whether or not according to application of the criteria a condition is satisfied. In an embodiment, once it is determined 912 that there are no additional candidate pairs to process, a search index is updated 914 based on what remained on the updated candidate list. A search index may be updated, for example, to include entries for keywords comprising components of a word combination. For example, referring to the table 800 of FIG. 8, a search index may be updated such that documents associated by the index with word combinations are also associated with keywords consisting of the word combination separated into its component pairs. As one particular example, if a document includes the term "wastebasket," an index may be updated such that the terms "waste" and "basket" and/or the term "wastebasket" are also associated with the document in the index. Generally, any way of updating the index based at least in part on the generated candidate list may be used.

Figure 10:
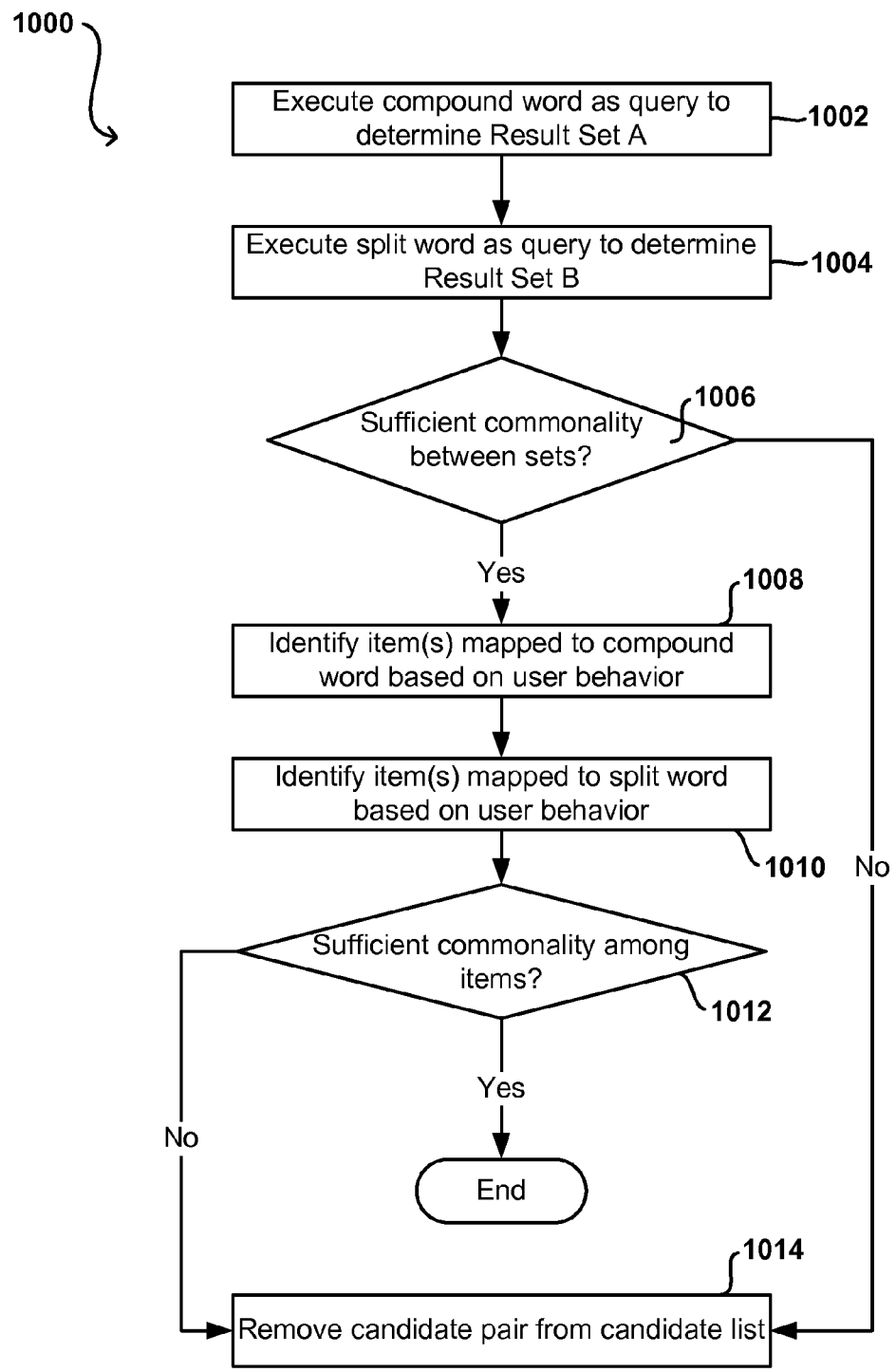
FIG. 10 illustrates example steps for refining a candidate list in accordance with various embodiments.

FIG. 10 shows a flowchart for an illustrative example process 1000 for determining whether to remove a candidate pair from a candidate list in accordance with an embodiment. The process 1000 may be used, for example, as a component of the process 900 described above in connection with FIG. 9 or variations thereof. In an embodiment, the process 1000 proceeds by first executing a compound word (collection of components, such as described above) as a query to determine a search result Set A. The process 1000 also includes executing a split word as a query (components of the compound word separately) to determine a search result Set B. It should be noted that executing the compound word as a query and executing the split word as a query are shown in a particular order in FIG. 10; however they need to be performed in the opposite order or simultaneously. Generally, as with other processes illustrated and described herein, elements illustrated as steps in the various figures may be performed in a manner different from the manner illustrated in the figures.

Returning to FIG. 10, once the search Result Sets A and B are determined, a determination 1006 is made whether there is sufficient commonality between the two sets. For example, the determination 1006 may include determining whether the Jaccard index of the two sets is large enough. The Jaccard index of the two sets is defined as the number of elements in the intersection of the two sets divided by the number of elements in the union of the two sets. In this manner, the Jaccard index provides a measure of the similarity of the two sets. By this example, the Jaccard index provides a measure of how closely search results of the compound word resemble search results of the split word. Using a term from the table 800 described above in connection with FIG. 8, search results from the search term "wastebasket" may be dissimilar from search results resulting from a query for "waste basket." The reason may be, for example, that the compound word wastebasket may correspond to a particular object or type of object, whereas when the words are separated from each other in a search query, additional results that are not necessarily related to that particular object may be included in the search result set. As another example, the compound word "birdhouse" in an executed search query may result in a search result set that is very similar to a search result set resulting from a search query consisting of "bird" and "house." The reason may be, for example, that the search query for the compound word "birdhouse" corresponds to documents relating to birdhouses and search results that include both of the words "bird" and "house" also generally are related to birdhouses. It should be noted that the Jaccard index is provided here as just an illustrative example of one criterion that may be applied to a candidate pair. The commonality between two sets, in various embodiments, is not limited to the use of a Jaccard index, but other means of measuring similarity between sets may be used.

If it is determined that the Jaccard index is large enough, then the process 1000 may include identifying items mapped to the compound word based on user behavior. The items may be, for example, items offered for consumption to users in an electronic market place. The items mapped to the compound word may be mapped to the compound word because users who have submitted the compound word as a search query have with sufficient frequency purchased the one or more identified items or otherwise have indicated interest in the one or more identified items. Actions that may indicate interest in one or more items may be, for example, placing one or more items in an electronic shopping cart, selecting search results corresponding to web pages that provide information about the items and the like. Similar in the process 1000, an embodiment may include identifying one or more items mapped to the split word based on user behavior. The one or more items may have been mapped to the split word because, for example, the users have with sufficient frequency purchased or otherwise expressed interest in the items subsequent to submission of the split word as a search query. Generally, items may be associated with search queries based on user behavior and the associations may be weighted based at least in part on actions taken by users that have submitted the search queries. The weights may be based on a frequency at which particular actions are taken during sessions that include submission of the search queries. In this manner, the more users take actions that are indicative of a relationship between the search queries and the actions, the stronger the association will be. The items mapped to search queries (compound words or split words) may have been mapped because one or more conditions based on user data behavior indicates an association of sufficient strength.

In an embodiment, a determination is then made 1012 whether there is sufficient commonality among the one or more items mapped to the compound word and the one or more items mapped to the split word. In one embodiment, for example, a Jaccard index may be computed for the set of one or more items mapped to the split word. The Jaccard index being of sufficient magnitude may, for example, indicate sufficient commonality among the items. If there is sufficient commonality among the items, then the process 1000 may end for the particular candidate pair for which the process 1000 is being performed; that is, the candidate is allowed to remain in a table or other data structure. If, however, it is determined that the Jaccard index of the Set A and the Jaccard index of Set B are not large enough or that there is not sufficient commonality among the items mapped to the compound word and mapped to the split word, then the candidate pair is moved 1014 from the candidate list in accordance with an embodiment.

It should be noted that the process 1000 illustrated in connection with FIG. 10 shows a specific example when all criteria of the candidate pair are required to be met for the candidate pair to be allowed to remain in a table or other data structure. In this particular example, for instance, the criteria are that the search results corresponding to the compound word and the split sufficiently overlap and that items mapped to the compound word and items mapped to the split word have sufficient commonality. Of course, as noted before, conditions may be more complex. For example, the condition on the Jaccard index of the search results may be relaxed if a Jaccard index on items mapped to each of the compound word and split word is sufficiently large. Generally, the conditions can be as simple or complex as desired in various embodiments.

Figure 11:
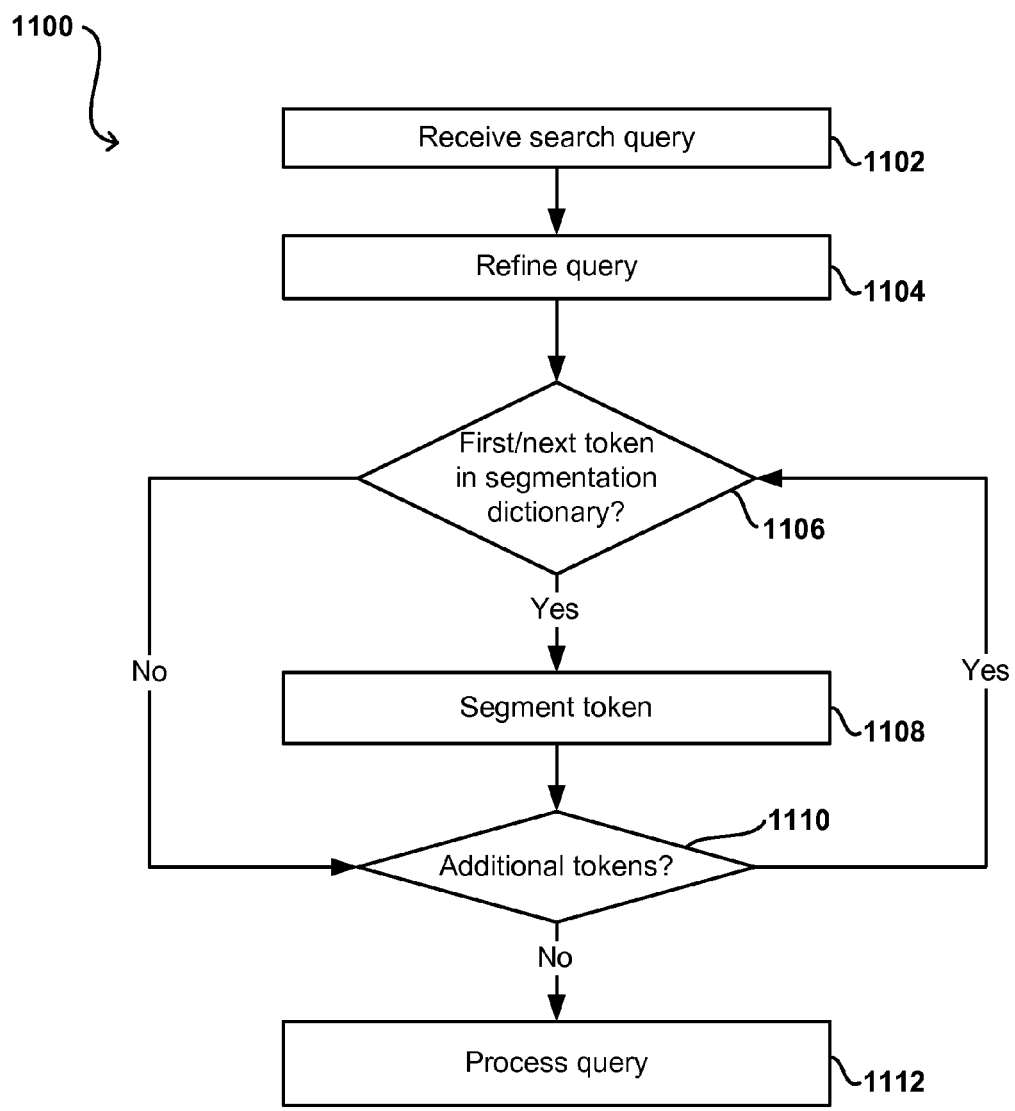
FIG. 11 illustrates example steps of a process for modifying search queries and processing the search queries in accordance with various embodiments.

As noted above, a table, such as table 800 as described in connection with FIG. 8, may be used not only to refine an index used by a search engine, but may be used to improve search results at the time a search query is submitted. For example, the processes described above may be used to identify instances when it has been determined to be better to replace a compound word with a search query consisting of specific components of the compound word. Accordingly, embodiments of the present disclosure include modifying search queries accordingly when it is determined to have been beneficial to do so. FIG. 11, for example, shows a flowchart of an illustrative example of a process 1100 for processing a search query in accordance with an embodiment. In an embodiment, the process 1100 includes receiving a search query 1102. The search query may be received, for example, from a user computer system through which a user has submitted the search query. However, the search query may be received in any suitable way.

In an embodiment, the received search query is refined 1104. The search query, for example, may be normalized by removing words considered to be stop words, such as articles "a", "and" and "the," words generally sufficiently so common that they are not helpful in locating search results. A stemming procedure may be performed in connection with one or more terms of the search query. Generally, any suitable refinement may be performed and, in some instances and/or some embodiments, no refinement may be performed (in other words, the refined query is the same as the original query). Refinement of the query may also include tokenization of the query. In an embodiment, a determination is made 1106 whether a first token of the refined query is in a segmentation dictionary where a segmentation dictionary may comprise a table, such as the table 800 described above in connection with FIG. 8 or other data structure that associates compound words with words fit into their components. The segmentation dictionary may be formed, for example, by refining a candidate list, such as in the manner described above. In an embodiment, the segmentation dictionary is created to include entries for which it has been determined to be better to replace a compound word with its components split up. Accordingly, in an embodiment, if it is determined 1106 that the first token of the refined query is in the segmentation dictionary; then the first token of the refined query is segmented 1108 into its components. A determination may then be made 1110 whether there are additional tokens in the refined query. If there are one or more additional tokens in the refined query, a determination may be made 1106 whether the next token is in the segmentation dictionary and, if it is, then it may be segmented 1108. This process may repeat as illustrated until a determination is made 1106 that there are no additional tokens in the refined query. At this point, the refined query, with any tokens replaced with their segmentations, may be processed 1112 accordingly. In this manner, the search results may be provided to the user as if the user had provided the search query, including the compound word already split into its components.

Figure 12:
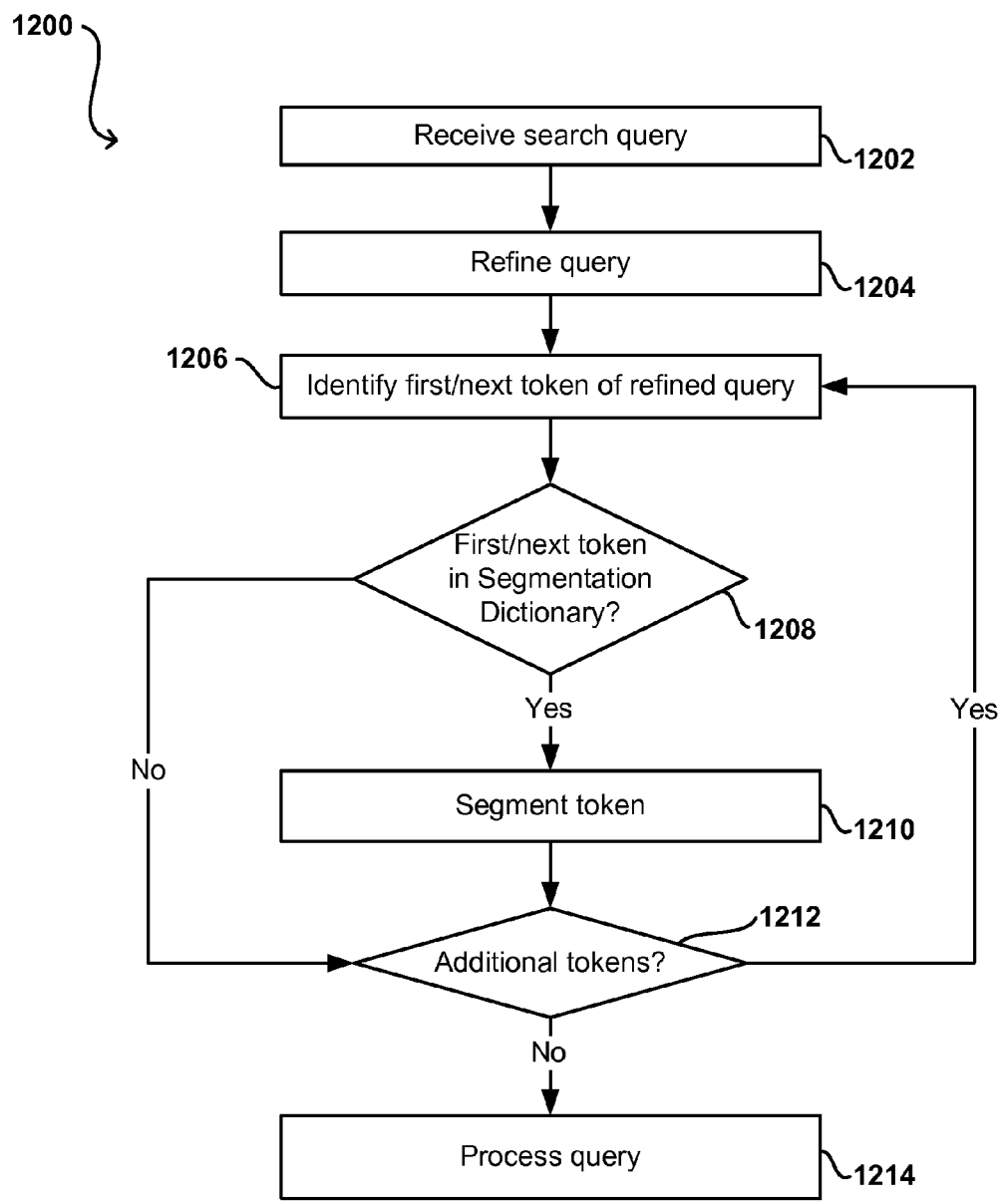
FIG. 12 illustrates example steps of a process for modifying search queries and processing the search queries in accordance with various embodiments.

FIG. 12 shows an illustrative example of a process 1200 for processing a search query which varies from the process 1100 described above in connection with FIG. 11. In FIG. 12, the process 1200 includes analyzing tokens for segmentation as those tokens are identified. In particular, as illustrated, the process 1200 includes receiving 1202 and possibly refining 1204 a search query as described above. As noted, refining a search query may leave the search query unchanged. However, in this example, refining 1204 the received search query may not include tokenizing the received search query. In an embodiment, a first token of the refined search query 1204 is identified 1206. Identifying the first (or any token) may be performed in any suitable manner, and the manner in which identifying a token is performed may vary depending on the language of the query. In one embodiment, the query comprises a sequence of characters and identifying 1206 the first token is performed by building a substring. Building the substring may be performed by, starting at one end of the string (which may depend on the language of the query), and adding characters of the sequence in order and, each time a character is added, checking a list that identifies potential tokens. Characters may be added and checked until the result is not found in the list. The token may be identified as the largest sequence that is found in the list.

In an embodiment, when the first token is identified 1206, a determination is made 1208 whether the first token is in the segmentation dictionary. As above, if the first token is in the segmentation dictionary, the first token may be segmented 1210 and a determination may be made 1212 whether there are additional tokens. If there are additional tokens, the next token may be identified 1206 and the above actions may be performed for the next token. Identifying the next token may be performed as described above, except building a sequence that begins at the first character that was not added to the previous token. This process may repeat, as indicated in FIG. 12, until a determination is made 1212 that there are no additional tokens of the refined query. At this point, the refined query, with any tokens replaced with their segmentations, may be processed 1212.

As discussed, for languages that do not explicitly demark token boundaries with spaces such as Japanese and Chinese, an appropriate method for identifying tokens may be applied. Existing methods include using a tokenization dictionary and extracting tokens based on the longest match found in the tokenization dictionary, or training a statistical model to maximize the likelihood of generating a tokenization based on a frequency weighted tokenization dictionary. In those cases where an existing tokenization system is used, the tokens can then be processed against the segmentation dictionary as described above. It is also possible to use the resulting segmentation dictionary produced, such as one described in FIG. 8, to segment text that does not explicitly mark token boundaries. The generated segmentation dictionary can be used as the input for known segmentation techniques, such as creating a new token for the longest match found in the segmentation dictionary from the left or the right of the input text. Any general technique that uses a dictionary to segment text can be used in conjunction with the approach described here.

To support tokenizing, for example, in connection with Japanese text, the system receives the search query. If an existing tokenization system is used, in an embodiment, the query is tokenized into tokens which are then processed individually. If not, the entire query is processed as a single token. To process a single token, the segmentation dictionary may be used in conjunction with one of many known algorithms for text segmentation. For illustrative purposes we will use longest match in the segmentation dictionary, starting from the left hand side of the input token. If the input token is one character only, that character is returned as the token. For input tokens greater than one character in length, in an embodiment, an index I is set to the length of the input token, and checks the dictionary for an entry with characters 1 to I. If the entry is found, the token is segmented as specified in the segmentation dictionary. If I is greater than 1, I is decremented, and the process is repeated. If I is equal to 1, then no entry was found, and the first character of the input token is returned as a new token, and the process starts over with the input token set to the string consisting of characters 2 to the end of the original input token. This process is repeated for each token.

Figure 13:
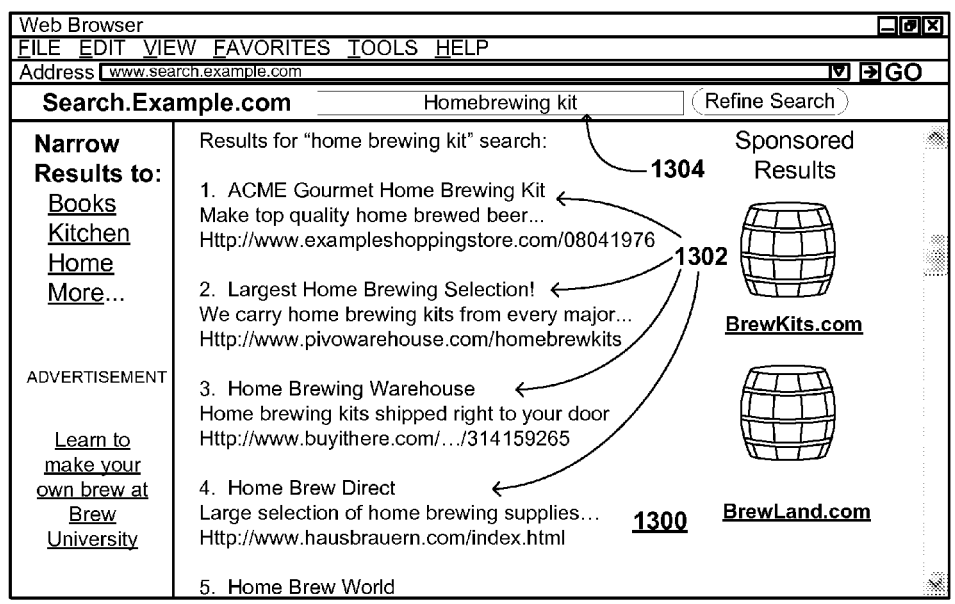
FIG. 13 illustrates an example of a web page showing search results generated in response to a search query in accordance with various embodiments.

FIG. 13 shows an illustrative example of a result of performing the process illustrated in FIG. 11 or other processes described herein (or variations) may appear. In particular, FIG. 13 shows an illustrative example of a web page 1300. The web page 1300 shown in FIG. 13 is in many ways similar to the web page 400 described above in connection with FIG. 4. However, in FIG. 13, search results are provided responsive to a user query comprising the terms "homebrewing kit." As shown, however, the search results 1302 on the web page 1300 include instances of "home brewing." A search engine may have received the query "homebrewing kit" and converted it to "home brewing kit" for processing and provided the results accordingly. Thus, use of the techniques of the present disclosure have the advantage that users receive relevant search results even though they submit search queries with terms that, according to common usage, should be segmented. The techniques described and suggested herein also have additional advantages. For example, using the example of the German term "Damenschuhe," above, users that submit queries with "Dame" and/or "Schuhe" may be presented with documents that do not necessarily include "Dame" or "Schuhe," but that include "Damenschuhe." Generally, the techniques of the present disclosure may be used to provide relevant search results (or other content, such as advertisements) regardless of whether users utilize compound terms or their segmentations in their search queries.

Variations of the embodiments described and suggested herein are considered as being within the scope of the present disclosure. As one example, to support various embodiments for different regions and languages, such as for an electronic marketplace offering items for consumption in multiple locations, multiple segmentation databases can be used, such as one per language. As discussed, each database can be used to generate a respective index as well as to process search queries, or there can be one instance of each database used for the indexing process and another instance of each stemming database used for query processing. In cases where search servers run searches in multiple live sites, or multiple instances of the same site in different languages, there might be several databases resident on a given machine.

As discussed above, processes for determining what character strings should be segmented can be repeated at various times in order to update the segmentation database such that the database always reflects the words and language currently being used, particularly in an environment where the dictionary is continually expanding. In the case of an electronic marketplace, for example, the building and/or updating of a segmentation database can occur regularly in order to keep up with new items, lines of products, content providers, etc. In some embodiments, a completely new database can be built each time in order to ensure that data that is no longer needed or relevant (e.g., for products that are no longer available) are no longer taking up space in the database. In other embodiments, the database is updated incrementally, with newer versions keeping prior entries and including newly encountered information, updated mappings, etc. In some embodiments, the data can have an associated time, decay value, or other such indicator such that if no occurrences of a word or form are received or encountered for a period of time, then information for that word or form can be removed from the database. Various other approaches to optimizing a given segmentation database can be used as well within the scope of the various embodiments.

In some embodiments as discussed above, a human judge or other such person can be tasked with evaluating the incremental changes in the database before those changes are applied. For example, a database generation process can analyze new query or log data and suggest a new set of entries for the segmentation database. The judge then can be tasked with evaluating the suggested entries and approving or rejecting each suggestion in order to provide an improved level of accuracy. Generally, a human judge may be able to override segmentation decisions made by automated processes. Such an approach can be beneficial as an automated suggestion process can occasionally make mistakes that a human judge or annotator who knows the language will catch before that mistake is applied. In addition, in some embodiments, certain types of words may be excluded from a segmentation process.

Further, while the present disclosure provides examples of providing search results to users in response to search queries submitted to the users, the scope of the present disclosure is not limited as such. Generally, the scope of the present disclosure also includes use of the various techniques described herein in other contexts. For example, techniques described and suggested herein may be used in any context that utilizes information retrieval processes for which segmentation may be applied. As a specific example, techniques described and suggested herein may be used to identify advertisements that are presented to users. A user's search query may be segmented in accordance with the techniques used herein and the segmented query may be used to identify one or more advertisements from a data store. In some instances, the user does not necessarily need to submit a search query. Content accessed by a user, for instance, may be associated with search queries and/or search queries may be derived from the content. Such search queries may be segmented in accordance with the present disclosure and used to identify advertisements or in other ways.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of processing search queries, comprising:
    under control of one or more computer systems configured with executable instructions,
        obtaining, using at least one computing device, behavioral information associated with a plurality of previously-submitted queries, the behavioral information associated with each previously-submitted query indicative of one or more actions taken by one or more of the corresponding searchers in connection with the previously-submitted query;
        identifying, from the obtained previously-submitted queries, a set of candidate pairs, each candidate pair including a first query and a second query, the first query including a set of separated words and the second query including a single word composed of a connected combination of at least a subset of the set of separated words, wherein the subset includes at least two words;
    refining, using at least one computing device, the set of candidate pairs by, for each member pair of at least a subset of the set of candidate pairs, at least:
        obtaining first search results corresponding to the first query of the member pair;
        obtaining second search results corresponding to the second query of the member pair;
        based at least in part on the first search results, the second search results, the obtained behavioral information associated with the first query of the member pair, and obtained behavioral information associated with the second query of the member pair, removing the member pair from the set of candidate pairs;
    updating, based at least in part on the refined set of candidate pairs, a segmentation database that includes a plurality of member pairs, wherein each member pair includes a first member comprising a set of separated words and a second member comprising a single word composed of a connected combination of at least a subset of the set of separated words of the first member;
    upon receiving a search query, comparing the search query against the plurality of member pairs in the segmentation database;
    upon identifying a corresponding member pair for the search query in the segmentation database, substituting the search query with the corresponding member pair; and
    processing the search query using the corresponding member pair.

2. The computer-implemented method of claim 1, wherein updating the segmentation database comprises, for at least one candidate pair of the refined set of candidate pairs, associating one or more documents with both the first query of the candidate pair and the second query of the candidate pair.

3. The computer-implemented method of claim 1, wherein the one or more actions are actions of an electronic marketplace.

4. The computer-implemented method of claim 1, wherein determining whether to remove the member pair from the set of candidate pairs includes calculating a measure of relatedness between the first search results and the second search results.

5. The computer-implemented method of claim 1, wherein the one or more actions are in connection with corresponding items offered for consumption in an electronic marketplace and wherein the computer-implemented method further comprises:

identifying, based at least in part on the obtained behavioral information associated with the first query of the member pair, a first set of items associated with the first query; and identifying, based at least in part on the obtained behavioral information associated with the second query of the member pair, a second set of items associated with the second query; and wherein removing the member pair from the set of candidate pairs is additionally based at least in part on a measure of relatedness between the first set of items and second set of items.

6. A computer-implemented method of processing search queries, comprising:

under control of one or more computer systems configured with executable instructions, obtaining, using at least one computing device, behavioral information associated with a plurality of previously-submitted queries, the behavioral information associated with each previously-submitted query indicative of one or more actions taken by one or more of the corresponding searchers in connection with the previously-submitted query;

identifying, based at least in part on the obtained behavioral information, a set of query pairs, each query pair including a first previously-submitted query composed of a first separated element and a second separated element and a second previously-submitted query composed of a single element that is a combination of the first separated element and the second separated element;

providing, using the at least one processor, the set of query pairs to a segmentation data store for use in processing subsequently received search queries, the segmentation data store including a plurality of query pairs each including a first member comprising a set of separated elements and a second member comprising a single element composed of a connected combination of at least a subset of the set of separated elements of the first member;

upon receiving a search query, comparing the search query against the plurality of query pairs in the segmentation data store;

upon identifying a corresponding query pair for the search query in the segmentation data store, substituting the search query with the corresponding query pair; and processing the search query using the corresponding query pair.

7. The computer-implemented method of claim 6, wherein providing the set of query pairs for use in processing search queries includes:

updating, based at least in part on the set of query pairs, a search index; and providing the updated segmentation data store for use in processing subsequently received queries.

8. The computer-implemented method of claim 7, wherein updating the search index comprises, for at least one query pair of the set of query pairs, associating one or more documents with both a set of one or more separated elements and a combination of elements corresponding to the query pair.

9. The computer-implemented method of claim 6, further comprising:

for each search query of a plurality of subsequently received search queries:

segmenting, based at least in part on the set of query pairs, at least one component of the search query to generate a transformed search query; and processing the transformed search query to identify one or more search results matching the transformed query; and providing information identifying the identified one or more search results in response to the search query.

10. The computer-implemented method of claim 6, wherein the one or more actions are user actions in an electronic marketplace.

11. The computer-implemented method of claim 6, wherein the one or more actions for the previously submitted query include at least one of: purchases in an electronic marketplace, placement in an electronic shopping cart of the electronic marketplace, and navigating to content dedicated to an item offered for consumption in the electronic marketplace.

12. The computer-implemented method of claim 6, wherein identifying the set of query pairs includes, for each query pair of at least a subset of the set of query pairs:

identifying a first set of items associated with a corresponding set of separated query elements;

identifying a second set of items associated with a corresponding combination of query elements; and determining that the first set of items and second set of items are sufficiently similar.

13. The computer-implemented method of claim 6, wherein the separated query elements are words separated from one another by a space or other delimiting character.

14. The computer-implemented method of claim 6, wherein the separated query elements are sets of one or more sequential characters from a corresponding combination of query elements.

15. A computer-implemented method of processing search queries, comprising:

under control of one or more computer systems configured with executable instructions, obtaining, using at least one computing device, a plurality of character strings forming at least part of queries previously submitted by corresponding searchers;

obtaining, using the at least one processor, behavioral information associated with the plurality of obtained character strings, the behavioral information associated with each character string indicative of one or more actions taken by one or more of the corresponding searchers in connection with the character string;

identifying, based at least in part on the obtained behavioral information, a plurality of pairs, each pair comprising a single character string from the obtained character strings and one or more substrings of the character string, the single character string being a connected combination of the one or more substrings; and providing, using the at least one processor, the plurality of pairs to a segmentation data store for use in processing subsequently received search queries, the segmentation data store including a plurality of pairs each including a first member composed of one or more substrings of a character string and a second member composed of a single connected combination of at least a subset of the one or more substrings of the character string of the first member;

upon receiving a search query, comparing the search query against the plurality of pairs in the segmentation database;

upon identifying a corresponding pair for the search query in the segmentation database, substituting the search query with the corresponding pair; and processing the search query using the corresponding pair.

16. The computer-implemented method of claim 15, wherein identifying the plurality of pairs includes, for each query pair of at least a subset of the query pairs:

identifying a first set of search results matching a character string corresponding to the query pair;

identifying a second set of search results matching one or more substrings of the character string; and determining that the first set of search results and second set of search results are sufficiently similar.

17. The computer-implemented method of claim 15, wherein the one or more substrings are words.

18. The computer-implemented method of claim 15, further comprising updating a search index by at least associating a document with a character string and substring of at least one pair, and wherein using the identified pairs to process search queries includes using the updated search index.

19. The computer-implemented method of claim 15, wherein using the identified pairs to process search queries includes:

receiving queries comprising character strings;

determining whether the character strings are part of pairs; and when the character strings are determined to be part of pairs, using corresponding substrings to process the queries.

20. The computer-implemented method of claim 15, wherein the one or more actions include actions taken in connection with items offered for consumption in an electronic marketplace.

21. The computer-implemented method of claim 15, wherein identifying the plurality of pairs includes:

identifying a plurality of candidate pairs; and for each candidate pair of the plurality of candidate pairs that comprises a corresponding character string and corresponding one or more substrings:

identifying a first set of one or more items associated with the corresponding character string and identifying a second set of one or more items associated with the corresponding one or more substrings;

calculating a measure of relatedness between the first set and the second set; and when the calculated measure indicates insufficient relatedness, discarding the candidate pair.

22. The computer-implemented method of claim 21, wherein the one or more items of the first set and the one or more items of the second set are items offered for consumption in an electronic marketplace and wherein the one or more items of the first set and the one or more items of the second set are associated with the corresponding character string and corresponding one or more substrings, respectively, due to recorded user actions in the electronic marketplace taken by users that have submitted the corresponding character string or corresponding one or more substrings as part of search queries.

23. A computer system for processing queries, comprising:
one or more processors; and
memory in communication with the one or more processors that includes executable instructions that, when executed by the one or more processors, cause the computer system to at least:

obtain behavioral information associated with a plurality of previously-submitted queries, the behavioral information associated with each previously-submitted query indicative of one or more actions taken by one or more corresponding searchers in connection with the previously-submitted query;

identify, based at least in part on the obtained behavioral information, a set of query pairs, each query pair including a first previously-submitted query composed of a first separated element and a second separated element and a second previously-submitted query composed of a single element that is a combination of the first separated element and the second separated element;

provide the identified set of query pairs to a segmentation data store for use in processing subsequently received queries, the segmentation data store including a plurality of query pairs each including a first member comprising a set of separated elements and a second member comprising a single element composed of a connected combination of at least a subset of the set of separated elements of the first member;

upon receiving a search query, compare the search query against the plurality of query pairs in the segmentation data store;

upon identifying a corresponding query pair for the search query in the segmentation database, substitute the search query with the corresponding query pair; and process the search query using the corresponding query pair.

24. The computer system of claim 23, wherein identifying the plurality of pairs includes:

identifying a plurality of candidate pairs; and for each candidate pair of the plurality of candidate pairs that comprises a corresponding character string and corresponding one or more substrings:

identifying a first set of one or more items associated with the corresponding character string and identifying a second set of one or more items associated with the corresponding one or more substrings;

calculating a measure of relatedness between the first set and the second set; and when the calculated measure indicates insufficient relatedness, discarding the candidate pair.

25. The computer system of claim 24, wherein the one or more items of the first set and the one or more items of the second set are items offered for consumption in an electronic marketplace and wherein the one or more items of the first set and the one or more items of the second set are associated with the corresponding character string and corresponding one or more substrings, respectively, due to recorded user actions in the electronic marketplace taken by users that have submitted the corresponding character string or corresponding one or more substrings as part of search queries.

26. A computer-readable storage medium having stored thereon instructions that, when executed by one or more processors of a computer system, cause the computer system to at least:

obtain a plurality of character strings forming at least part of queries previously submitted by corresponding searchers;

obtain behavioral information associated with the character strings, the behavioral information associated with each character string indicative of one or more actions taken by one or more of the corresponding searchers in connection with the character string;

identify, based at least in part on the obtained behavioral information, a plurality of pairs, each pair comprising a single character string from the obtained character strings and one or more substrings of the character string, the single character string being a connected combination of the one or more substrings;

provide the identified plurality of pairs to a segmentation data store for use in processing subsequently received queries, the segmentation data store including a plurality of pairs each including a first member composed of one or more substrings of a character string and a second member composed of a single connected combination of at least a subset of the one or more substrings of the character string of the first member;

upon receiving a search query, compare the search query against the plurality of pairs in the segmentation data store;

upon identifying a corresponding pair for the search query in the segmentation data store, substitute the search query with the corresponding pair; and process the search query using the corresponding pair.

27. The computer-readable storage medium of claim 26, wherein using the identified pairs to process search queries includes:

receiving queries comprising character strings;

determining whether the character strings are part of pairs; and when the character strings are determined to be part of pairs, using corresponding substrings to process the queries.

28. The computer-readable storage medium of claim 26, further comprising updating a search index by at least associating a document with a character string and substring of at least one pair, and wherein using the identified pairs to process search queries includes using the updated search index.

* * * * *